March 17, 1936.  G. L. HOGAN  2,034,189
CALCULATING DEVICE
Filed Dec. 10, 1934   3 Sheets-Sheet 1
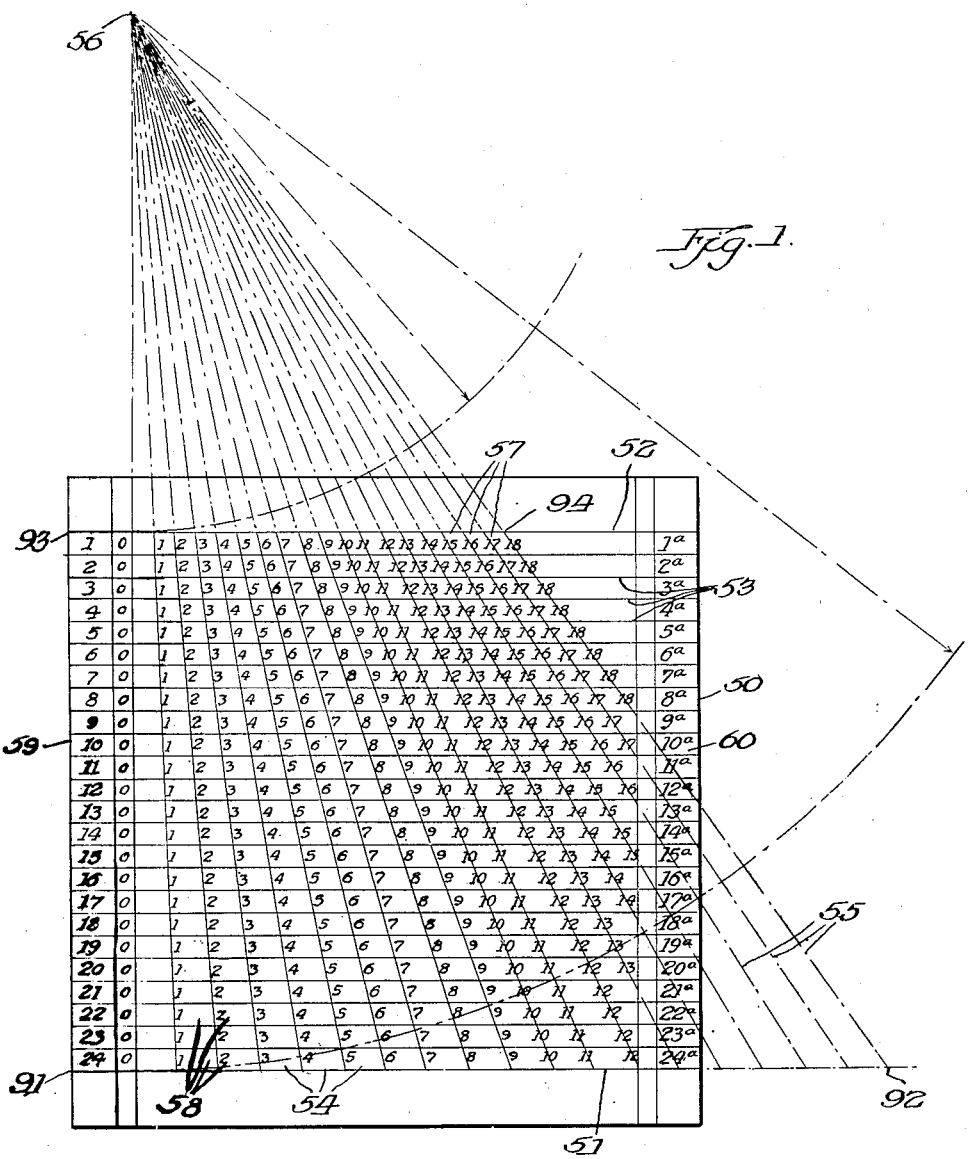
Inventor
George L. Hogan
By James R. McKnight
Attorney March 17, 1936.     G. L. HOGAN     2,034,189
CALCULATING DEVICE
Filed Dec. 10, 1934     3 Sheets-Sheet 2
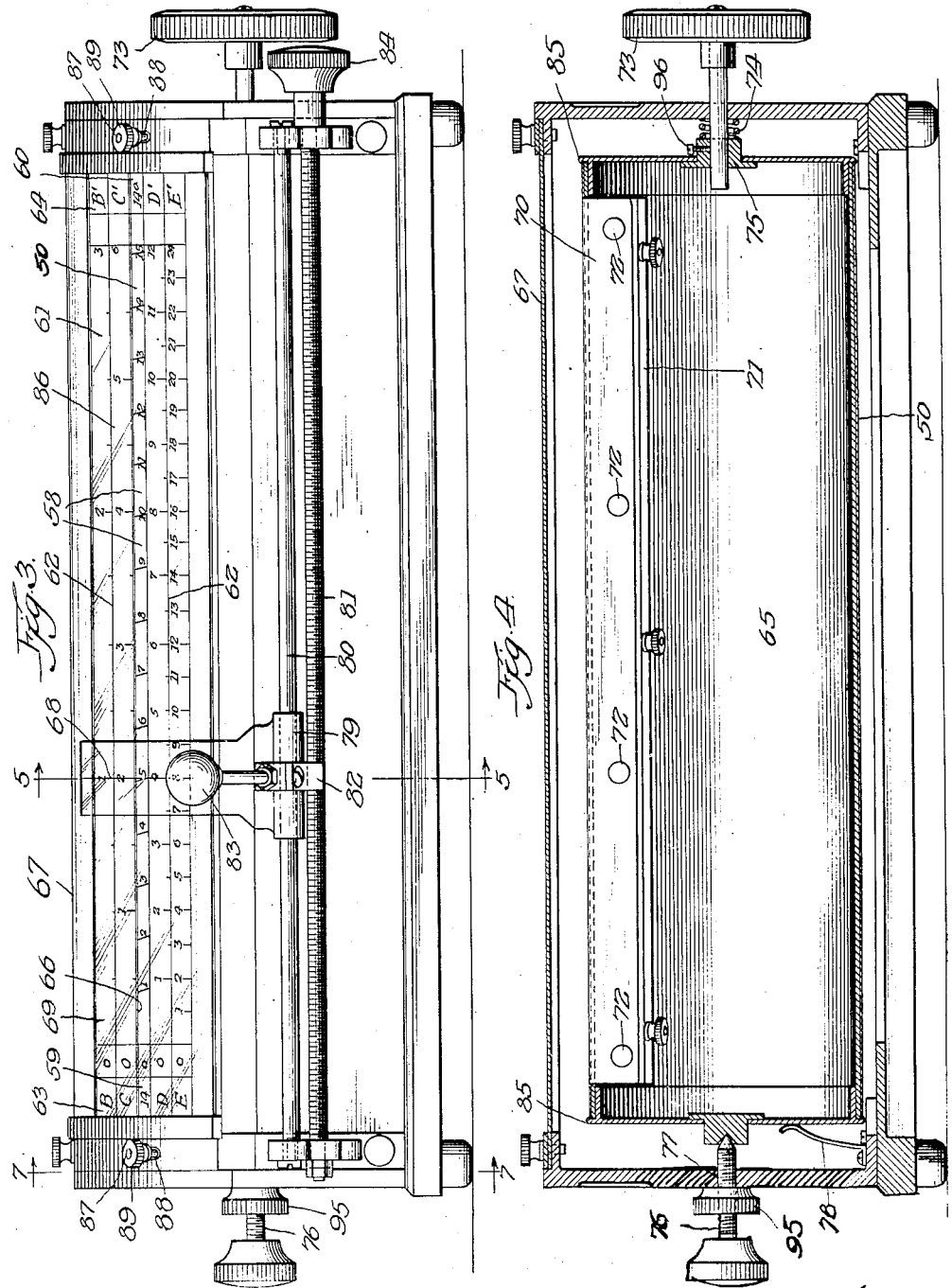
Inventor
George L. Hogan
By James R. McKnight
Attorney March 17, 1936.  G. L. HOGAN  2,034,189
CALCULATING DEVICE
Filed Dec. 10, 1934  3 Sheets-Sheet 3
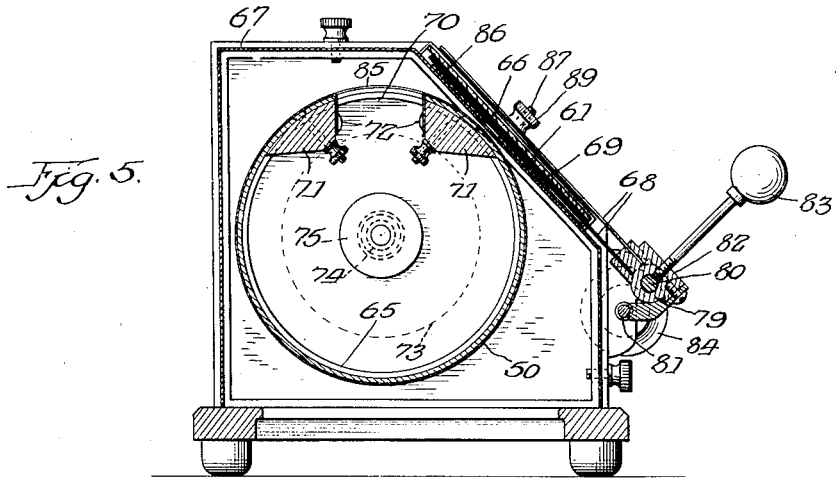
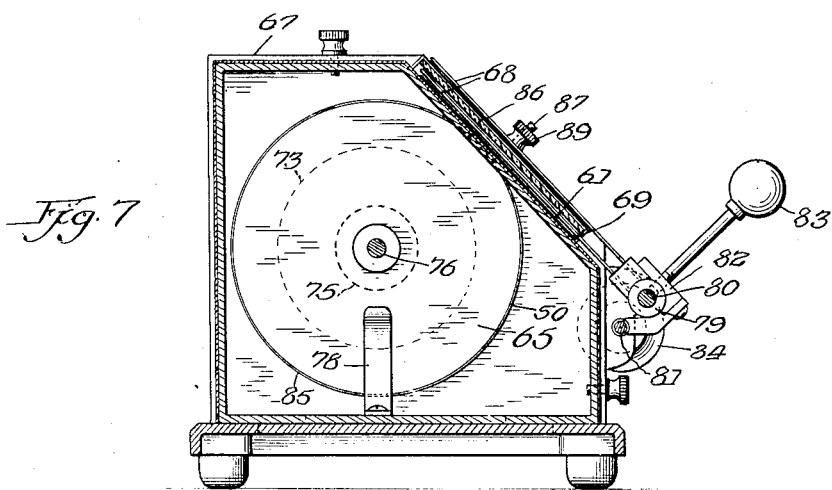
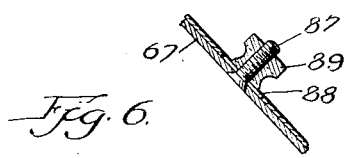
Inventor
George L. Hogan
By James R. McKnight
Attorney Patented Mar. 17, 1936

2,034,189

UNITED STATES PATENT OFFICE 2,034,189

CALCULATING DEVICE

George L. Hogan, Chicago, Ill., assignor, by mesne assignments, to The Robert Britigan Corporation, Chicago, Ill., a corporation of Illinois Application December 10, 1934, Serial No. 756,795

2 Claims. (Cl. 235—61)

My invention relates particularly to improvements in calculating devices for figuring quantities of materials, particularly in taking inventory, the principle of which is based upon converting pounds into units of quantity or vice versa.

Among the objects of my invention are to provide a device which will eliminate the necessity of counting or measuring units from a partly used stock; to produce a device which will save time, energy and error in taking inventory, and such other objects, advantages and capabilities as will later more fully appear and which are inherently possessed by my invention.

While I have shown in the accompanying drawings a preferred embodiment of my invention yet I wish it understood that the same is susceptible of modification and change without departing from the spirit of my invention.

Referring more particularly to the drawings:
Fig. 1 is a face developed view of my weight chart; Fig. 2 is a face view of my unit charts; Fig. 3 is a front elevation of my entire structure; Fig. 4 is a longitudinal sectional view through the axis of the cylinder; Fig. 5 is a cross-sectional view showing details of my hair-line indicating device; Fig. 6 is a detail showing construction of mounting of the transparent panel to the casing; and Fig. 7 is a transverse sectional view on a line 7—7 of Fig. 3.

My invention more in detail comprises a plurality of charts relative to and in operative relation with each other. One of said charts is the weight chart 50 of trapezoidal original form, said weight chart being formed by two parallel lines intersecting a right angle triangle, one of which lines forms a base of such trapezoid and hereinafter referred to as the abscissa 51 and the other parallel line 52 forming the top boundary of said trapezoid and a series of intermediate parallel lines 53 preferably equally spaced intersecting said trapezoid parallel to said abscissa.

The abscissa base 51 of the trapezoid is subdivided into a plurality of equal divisions 54 from which divisions radial lines 55 are drawn to the apex 56 of said triangle or to the center of the circle to which said abscissa or base line 51 is tangent. Said radial lines 55 will divide the upper boundary line 52 of the trapezoid by their respective intersections of it into a plurality of divisions 57 proportionate to the divisions 54 of the base of said trapezoid, which two classes of spaces are respectively proportionate to the respective tangent multiplied by the radius of each respective circle. On the right angle altitude side of the trapezoid I draw an index margin parallel to its altitude line and at a predetermined distance opposite such margin I draw a parallel index margin which margins are intersected by the respective parallel lines 53 drawn in an abscissa direction which subdivision of spaces form scales parallel to said abscissa and through said trapezoid thus dividing it into a plurality of sections 58. At the intersection of each of said parallel lines and the radial lines I place a figure. Beginning with the former altitude line I mark each of its intersections with said parallel lines with the figure 0. The next consecutive radial line and its intersections with such parallel lines are marked with the figure 1 and so on in arithmetical progression in an abscissa direction until said radial lines are intersected by the normal boundary line at the opposite side of said chart, such boundary line cutting through the trapezoid form so used in platting the respective locations of the various figures. After the chart is thus laid off the actual chart will be preferably in the form of a rectangular sheet having parallel lines in a direction of the base or abscissa of such rectangle said lines being intersected by a plurality of radial lines from the point of intersection of the two opposite boundary lines which connect from the abscissa or base of the trapezoid to its upper parallel boundary line thus dividing it into a plurality of scalene trapezoidal sections in respective rows in an abscissa direction. Index margins 59 and 60, preferably on each side of said chart, are provided; the object of such index margins being hereinafter explained.

I also provide a unit chart 61 relative to and in operative relation with the aforesaid trapezoidal or weight chart 50. This unit chart 61 comprises a plurality of parallel lines 62 preferably equally spaced intersecting the boundary lines of respective index margins 63 and 64 at each end of said unit chart which index margin lines register or correspond with the index margins 59 and 60 of the trapezoidal chart 50 and each of which parallel lines carries a series of figures located in such manner that a line drawn normally through said parallel lines in both charts, when such charts are placed in a position so that the margin lines of the one will register with the margin lines of the other, will intersect figures along the radial lines of the trapezoid chart and also figures on the unit chart in a manner that when such index line is placed across a figure on the unit chart that predetermined figures may easily be found and followed on the weight chart.

To locate said figures properly and prevent breaks in going from one line of figures of the unit chart to another, I prefer to arrange them in such order that the position of each like unit of each line of unit figures on said unit chart will be determined by the distance in an abscissa direction from the 0 line equal to a tangent of the angle formed by the 0 or normal line radius and the intersection of the successive radial line of the trapezoidal chart as follows: on the beginning line of the unit chart the first or starting unit from 0 will be equal to the tangent of the angle of the first or the chosen radial line of the trapezoidal chart and the 0 radial line at a point of intersection of said radial line and said abscissa or other base abscissa line chosen. The first unit on the second line of the unit chart will be a distance from the 0 line equal to the tangent at such point of the angle formed by the 0 line and the second chosen radial line of the trapezoidal chart. The first unit or starting point on the next line of the unit chart will be a distance of the tangent of the angle of the 0 line at such point of intersection and the next chosen radial line of the trapezoidal chart to be determined in the same manner and the respective lengths of the base and top boundary of the trapezoidal used in platting such chart to be determined by the following formula in which $(r)$ represents the radius of a circle tangent to the base line and $(r')$ the radius of a concentric circle of tangency to the top line of said trapezoid and $(a)$ represents the length of the top and $(b)$ the length of the base of said trapezoid and $(H)$ the angle of intersection of the two other opposite sides of the trapezoid projected, i. e.:—

$$a = r' \tan H$$
$$b = r \tan H$$

Having thus located the starting point of each respective line of the unit chart I mark the starting point a unit that will best suffice the purpose. If we make the first unit 2, we will then know that unit 1 will be half way between 2 and the 0 line and is filled in and the entire line may be filled out with 3—4—5 and 6 etc., by using such respective distances between each of them until that line is figured to the opposite margin. On the next scale the starting point will again be 2 and 1 will be located at a point half of it's distance from the 0 line, and this line can be filled out by using the same distance between each and in this way the unit chart can be filled out for use for varied quantity figuring. Higher or lower graduations of said scales may be attained by increasing the denominations of the starting unit. The index margins on each side of the chart are for determining the chart used and to be used in future calculations of the same article. It is possible to use the weight chart for units and the unit chart for weights, in which event the line chosen may be registered by a key number on the opposite side of the chart from the index margin used for registering when the weight chart is used for units.

I prefer to mount the trapezoidal or weight chart 50 on a cylinder 65 and to space the unit charts on a scale parallel to the axis of the cylinder and in close proximity to it and provide a view slot 66 in the case housing 67 of said cylinder 65 in such manner that a hair-line or index line 68 crossing the unit chart 61 will also pass over the cylinder 65 and the numbers on the cylinder may be read with respect to the numbers on the unit chart.

I also prefer to mount the unit chart 61 on a mounting 69 of suitable material in such manner that a number of the parallel lines 62 of the chart will be separated from the remaining parallel lines by a slot opening 66 through which the cylinder or weight chart 50 may be read. This also prevents confusion of a number of figures where several figured parallel lines are used. I prefer to make this mounting 69 removable and attached to the housing 67 of the cylinder 65 to which a hair-line indicator arrangement is also attached and in such manner that the housing may be removed with the unit chart and index pointer without disturbing either. The removable chart is for the purpose of enabling a machine to be made, to operate within a limited scope on the chart and when a greater or less scope is desired the chart may be changed and the starting units made less or greater as its purpose requires. I also prefer to provide a cylinder capable of removably holding the weight chart which in this particular case I show as a cylinder having a slot 70 to the edges of which are attached wooden strips 71 or equivalents, whereby a chart printed on a flexible material may be stretched around the cylinder and held by thumb-tacks 72 to said wooden strips 71. In order to facilitate the adjustment of the chart on the cylinder to the unit chart getting the accurate registration of their respective 0 lines I mount the cylinder on an axis fitted at one end with means 73 for turning the cylinder and a compression spring 74 or equivalent interposed between its bearing 75 and said cylinder; the cylinder being mounted at the other end on a pivot mounting 76 threaded into a bearing 77 in such manner that a to and fro motion of the cylinder in the direction of its axis can be had by screwing such pivot bearing 76 in or out thereby pressing the cylinder against such compression spring 74 which will force it back when such pivot screw is turned in the direction to release the pressure on said spring.

I also provide a brake or friction device 78 for pressing against the cylinder to cause it to stay in place as the respective lines of figures are brought under the slot in the housing for observation and in order to obtain a very accurate adjustment of the hair or indicating line 68, I preferably construct an indicator of a flexible, transparent material upon which is engraved, or equivalent, a hair-line. The said indicator is held in a holder 79 capable of sliding along a guide rod 80 mounted parallel to the axis of the cylinder. I also provide a threaded parallel rod 81 in operative relation with the index holder of such slide rod and a knife-edge or threaded member 82 attached to said indicator holder removably engaging said threaded rod; said threaded member 82 may be a plurality of threads to fit the threads of such threaded rod 81 or it may be a portion of a circle that can be lifted on and off the rod by a handle 83 attached thereto and preferably arranged so that the spring of the indicator material will keep such threaded member 82 in mesh with said threaded rod 81 at all times and when it is desired to slide such indicator on the rod it is disengaged from such threaded rod by lifting or operating the handle 83 attached to or in operative relation with said index holder. I prefer to fit one end of this threaded rod with a handle 84 whereby a rotary motion may be imparted to said rod for said purpose.

In order to always get the same angle of view in reading the figures in the operation of this device I prefer to use two hair-line indicators 74

68 one above the other fixed in a position that such hair-lines or sight dots are in a plane that will intersect the axis of the cylinder at right angles. This mechanism may be varied in different forms and said housing may be removably held in place by screws or other well known methods. In making the chart cylinder, I prefer to have a bead 85 at its end projecting radially a slight distance above the thickness of the chart as a line stop to assure the chart being mounted straight. I prefer to have a glass or other transparent covering 86 over the unit chart having a space provided between it and said chart sufficient to enable the lower indicator to operate between said glass and said chart. I also prefer to removably attach the mounting of the index of the unit chart to the housing by a stud 87 in each end of the housing to pass through slotted bearings 88 in each end of said chart mounting for the purpose of adjusting the lines of said chart with the lines of the cylinder chart and nuts 89 are provided to engage said screw studs and hold said chart mounting in a fixed position when properly adjusted.

Fig. 1 represents the weight chart 50 which is formed by intersecting the triangle between points 56, 91 and 92 by parallel lines 51, 52, and 53 which form the trapezoid between points 93, 91, 92, and 94, also a portion of the triangle as shown by dotted lines, as that portion is cut off for convenience in mounting by the vertical index chart (1—a to 24—a), thus forming the actual chart into a rectangle having one index chart (1—24) and an opposite index chart (1—a to (24—a). This entire rectangle and portion of the trapezoid bounded by it are cut into sections by lines parallel to the base from (1—24) which lines extend across the index columns. The base line 91—92 is divided into a plurality of equal spaces 54 and lines are drawn from each respective space division to the apex 56 of the triangle which lines are radial lines from 56 as a center and having a normal radius 56—91. Each intersection beginning with 93—91 is indexed by consecutive numbers, the first intersection being indexed 0, the next one 1, the next one 2, the next 3 etc., up to the point where it intersects the normal opposite index border line. These various radial lines (1—2—3 etc.) intersect the upper boundary 93—94 of the trapezoid into divisions equal to each other and proportional to the divisions in the line 91—92 and cut the trapezoid into a plurality of small trapezoids arranged in rows parallel to 91—92. Each of these radial lines are numbered with the same respective number at its each intersection with the parallel lines. The next radial line is accordingly numbered and each radial line which extends through the chart in a diagonally disposed direction bears the same number which allows a field for a hair-line indicator to find an intersection along such radial line to correspond with the predetermined lateral line reading of the unit chart both of which may be recorded by their number in the margin index of said intersections.

Fig. 2 is a diagram of a unit chart to operate in connection with the weight chart before described. This chart has an index margin 63 and 64 on each end, the border lines of which register with corresponding border lines of the weight chart and in this particular illustration it is shown as two horizontal graduated scales above and two below a slotted opening in its mounting. This scale is so graduated that when a hair-line indicated intersects one unit on said scale that it has a wide range of movement along said scale within the path of one or more of the graduated radial lines of the weight chart and when the weight chart is mounted on a cylinder to rotate and it is desired to set the indicator for such as five pounds on a package containing eight units such indicating hair-line may be set at the nearest eight units to the right on the unit line E of the unit scale and the cylinder rotated until such hair-line intersects five units on the weight chart, which in this instance is on line 14 of said chart which should be recorded for future use; in future calculations of the remainder of said package after an unknown quantity of its units have been used, the package is again weighed and the weight chart indexed 14 is brought in view and the hair-line moved to its new weight opposite which on the recorded index E of the unit chart will be found the remaining unit quantity. In ascertaining the chart to be used in such calculations, the nearest figure of the known quantity on the unit chart to the right of known weight number at the top of the radial lines of the weigh chart shall be chosen as a setting point for the hair-line; then by revolving the cylinder holding the weight chart, its diagonally disposed repetitions of said number will occur under said hair-line until the proper registration is had which marginal index will indicate the chart to be used in recording said data for future use. In case that one scale does not meet the requirement and it is necessary to shift it to another scale said scale shall be so proportioned in graduations that no break in consecutive units will occur and to assure this the first unit is fixed at a point opposite to where the first radial line from 0 intersects the base, which if 2 on the unit scale E said intersection when projected upward will intersect radial line 2 at the top of the chart and the original line of 2 will intersect the bottom line of the chart at a point when projected downward will be 4 on scale E of the unit chart, which intersection projected upward to intersect the upper line of the weight chart will intersect at 4, which diagonally disposed line of 4s will intersect the base line of the weight chart at 4, which projected down will be 8 on the unit chart and in this manner the whole chart is platted per description heretofore given in the specification.

It is, of course, understood that the number of radial lines determining the size of the weight chart and also the extent of the scale on the unit chart may be increased beyond the examples shown in Figs. 1 and 2 to take care of the particular requirements of the device such as where increased weight or quantity is to be ascertained.

My adjustment screw 76 is held in locked position by lock nut 95. A turning or rotating means 73 is locked to cylinder 65 by means of set screw 96 in bearing 75.

Having thus described my invention, I claim:
1. In a computing device, a movable member, a fixed member, a series of scales mounted on said fixed member, a scale of symbols mounted adjacent said fixed scales, each symbol being different and identifying each of said fixed scales respectively, a scale on said movable member divided into sections, a row of symbols mounted adjacent said movable scale, each symbol being different and identifying each section respectively, a section of said movable scale and any of said fixed scales cooperating in accordance with a definite value set up to correlate the symbol of said fixed scale and the symbol of the cooperating section of the movable scale for a particular problem to be computed.

2. In a computing device, a series of scales, a row of symbols adjacent said scales, each symbol being different and identifying each of said scales respectively, a chart divided into sections, a row of symbols adjacent said chart, each symbol being different and identifying each section respectively, said series of scales and said chart movable relative to each other, a section of said chart, and any of said scales cooperating in accordance with a definite value set up to correlate the symbol of said scale and the symbol of the cooperating section of said chart for a particular problem to be computed.

GEORGE L. HOGAN.